April 10, 1962 E. W. MANTEUFFEL 3,029,376

DIRECT CURRENT DRIVEN MAGNETIC AMPLIFIER

Filed April 10, 1958

Inventor:
Erich W. Manteuffel,
by Allen E. Amgott
His Attorney.

United States Patent Office 3,029,376
Patented Apr. 10, 1962

3,029,376

DIRECT CURRENT DRIVEN MAGNETIC AMPLIFIER

Erich W. Manteuffel, Ithaca, N.Y., assignor to General Electric Company, a corporation of New York Filed Apr. 10, 1958, Ser. No. 727,614
6 Claims. (Cl. 321—25)

This invention relates to magnetic amplifiers employed for electrical control or regulating purposes, and more particularly, to magnetic amplifiers capable of being supplied by direct current sources.

Magnetic amplifiers have been utilized in the past for control or regulator purposes. However, in order to operate such amplifiers, there was required a main alternating current power source. Where only direct current supplies were available, means such as rotating inverters or certain types of power oscillators were needed to convert the direct current supply to alternating current power so that the amplifiers could function properly.

It is an object of the present invention to operate a magnetic amplifier directly from a direct current source.

A further object of this invention is to utilize a switching circuit incorporated in a magnetic amplifier to drive current through the core of the magnetic amplifier that is being supplied by a direct current source.

A still further object of the present invention is to provide a magnetic amplifier capable of being driven by direct current, the output of which is suitable for use as a regulated direct current power supply.

Other objects and many of the attendant advantages of the invention will be readily appreciated as the same become better understood by reference to the following detailed description when considered in connection with the accompanying drawings wherein.

As mentioned hereinbefore, magnetic amplifiers have been used for regulator purposes where a main alternating current power source was available. If only a direct current source existed, various means were employed for converting such direct current source. Such converters had to be capable of furnishing the total maximum input power to drive the magnetic amplifiers. A system, to be more fully explained hereinafter, has been devised for converting a small portion of a direct current source to alternating current and utilizing the major portion of the direct current source for regulating and controlling purposes. Briefly, the magnetic amplifier comprises a switching transistor circuit electrically coupled to a pair of magnetic cores, whereby, a direct current source can be employed satisfactorily for driving said magnetic amplifier. This is of great advantage in that relatively high carrier frequencies can be selected for supplying magnetic amplifiers.

Figure 1:
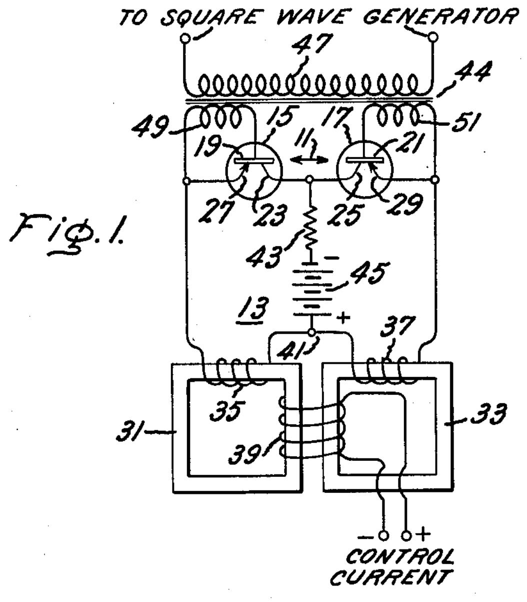
FIG. 1 is a schematic diagram of the apparatus and circuitry illustrating one embodiment of a direct current driven magnetic amplifier employing a switching transistor circuit.

In the FIG. 1 embodiment of this invention, there is illustrated a switching transistor circuit 11 electrically coupled to a pair of magnetic cores in a magnetic amplifier 13. One form of said switching circuit incorporated in magnetic amplifier 13 comprises a pair of power transistors 15 and 17 of the p-n-p type, each transistor having a base electrode 19, 21, a collector electrode 23, 25 and an emitter electrode 27, 29. Magnetic amplifier 13 includes a pair of magnetic cores 31 and 33 of the square loop type, having two gate coils or core windings

35 and 37 serially connected and disposed in inductive relationship with said magnetic cores. The other ends of gate coils 35 and 37 are connected to said power transistors at emitters 27 and 29, respectively. A control winding 39 is wound around both magnetic cores 31 and 33 and is employed to control the flux swing within said cores. Connected to both collector electrodes 23 and 25 and to the common point 41 of coils 35 and 37 is a series circuit containing a load represented by resistor 43 and a source of direct current power such as a battery 45 with its polarity indicated by a plus and minus sign. It is to be observed that this invention is not limited to transistors of the p-n-p type. Power transistors of the n-p-n type can be employed by reversing the polarity of the direct current source of FIG. 1.

Transistors 15 and 17 of magnetic amplifier 13 are controlled from a suitable generator, such as, a square-wave transistor oscillator or a square-wave generator (not shown) by means of a transformer 44. Said transformer has a primary winding 47 and a pair of secondary windings 49 and 51, said secondary windings being connected between the base and emitter electrodes of each transistor. Said transistors 15 and 17 are gated alternately by means of the square-wave transistor oscillator or generator. If a transistor oscillator is used, winding 47 would be the saturable reactor output winding of such transistor oscillator. Further, in view of the small amount of power required to energize the base-emitter circuit of switching circuit 11, one square-wave transistor oscillator is sufficient to supply power to the base-emitter circuits of a plurality of direct current driven magnetic amplifiers.

In operation, first the transistor 15 is in a conducting state during one half cycle of the voltage supplied to its base-emitter circuit from the square-wave transistor oscillator and, alternately, upon reversal of polarity of the square-wave oscillator, transistor 17 goes into conduction during the other half-cycle of said square-wave oscillator. During the first half-cycle, the battery 45 is connected to gate winding 35 allowing direct current to flow through the winding in one direction. In the second half-cycle, battery 45 is connected to gate winding 37 allowing current to flow through it in the other direction. Depending on the amount of control current flowing in control winding 39, which is supplied by a direct current source (not shown), more or less voltage will be absorbed at the gate windings 35 and 37 during the pre-firing interval until the magnetic cores 31 and 33 become saturated. Thus, the current furnished from a suitable direct current source, such as battery 45 to a load 43 can be magnetically controlled in exactly the same manner as when A.-C. current sources are used for supplying power to magnetic amplifiers.

Amplifier 13 may be employed for field or armature regulation of small D.-C. motors and, where the load 43 is predominantly inductive, stable operation of said amplifier can be achieved by inserting a so-called "free-wheeling" or by-pass shunt rectifier (not shown) across the load terminals of said load 43.

Figure 2:
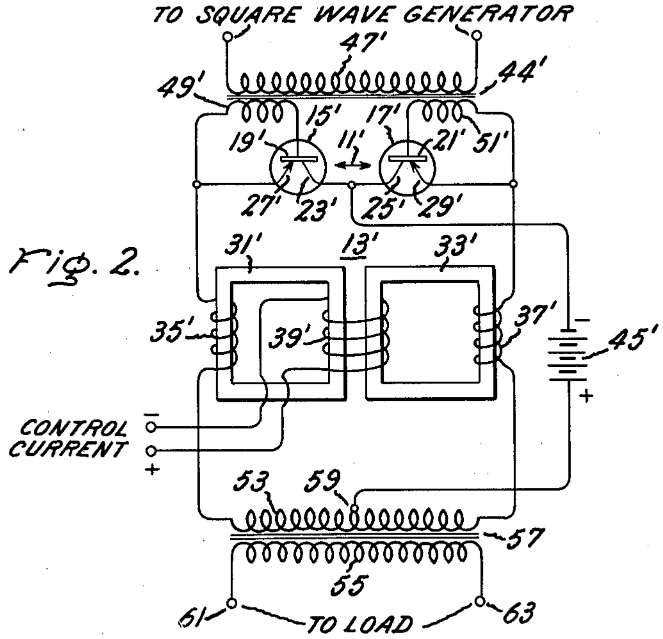
FIG. 2 is a schematic diagram of the apparatus and circuitry illustrating a second embodiment of a direct current driven magnetic amplifier, the output of which is suitable for use as a regulated direct current power supply.

In FIG. 2 there is shown a second embodiment of applicant's invention. Similar portions of the circuitry are represented by prime characters. It is to be noted that the switching transistor circuit 11' incorporated in magnetic amplifier 13' is exactly the same as circuit 11 with one end of gate windings 35' and 37' being connected to emitters 27' and 29' respectively. The other ends of said gate winding are, however, connected to opposite ends of primary winding 53 of transformer 57. A source of direct current represented by battery 45' with its polarity indicated is connected between the common collectors 23' and 25' and a center tap 59 on primary winding 53 of transformer 57. A load (not shown) to be controlled is connected across the output terminals 61 and 63 of secondary windings 55. It is to be recognized that battery 45′ may be utilized to supply power to the square-wave transistor oscillator in addition to the load because such transistor oscillator requires only a small amount of power for satisfactory operation.

Operation of the circuit shown in FIG. 2 is essentially the same as described hereinbefore with reference to FIG. 1. Here, however, magnetic amplifier 13′ furnishes alternating current output power to the load instead of direct current power as in FIG. 1. This is accomplished by means of transformer 57 and the direct current source 45′ being connected between the common collectors 23′ and 25′ and a center tap 59 on primary winding 53, the opposite ends of which are connected to other ends of gate windings 35′ and 37′.

Further, magnetic amplifier 13′ can be adapted easily for providing a regulated direct current power supply by simply inserting a rectifier and filter (not shown) between output winding 55 and the load. Still further, with well known methods of feedback control, the direct current output voltage of said magnetic amplifier 13′ can be accurately regulated, this despite fluctuations in the voltage of direct current source 45′. Thus, a well regulated, high direct current voltage can be obtained from a low-voltage direct current source or battery.

From the foregoing description it is seen that by means of incorporating a switching transistor circuit in a magnetic amplifier, said magnetic amplifier can be operated directly from a direct current power source. While particular embodiments of the invention have been shown and described herein, it is not intended that the invention be limited to such disclosure, but that changes and modifications can be made and incorporated within the scope of the claims.

What is claimed:

1. A magnetic amplifier, supplied by a direct current source, comprising: a pair of magnetic cores, each core having a gate winding thereon, said gate windings being serially connected by a first common junction; a control winding, for controlling the swing of magnetic flux within said cores, wound about both cores; a pair of switching transistors, each transistor having a base electrode, an emitter electrode and a collector electrode, the emitter electrodes each being connected to one of the remaining terminals of the respective gate windings, said collector electrodes being serially connected by a second common junction; series-connected direct-current source and load means, said series-connected source and load means being connected between the first and second common junctions; and, square wave generator means coupled with the base-emitter electrodes of both transistors for alternately causing said transistors to conduct.

2. A magnetic amplifier, operable by a direct current source, comprising: a pair of magnetic cores, each core having a gate winding thereon, the gate windings being serially connected by a first common junction; a control winding, for carrying a control current, wound about both said cores; a pair of transistors, each transistor having a base electrode, an emitter electrode and a collector electrode, each emitter electrode being connected with a remaining terminal on one of the gate windings; series-connected direct-current source and load means connected between the first common junction and both collector electrodes; a transformer having a square wave generator means connected with the primary winding thereof, said transformer including a pair of secondary windings, one secondary winding being connected across the base-emitter electrodes of one transistor and the other secondary winding being connected across the base-emitter electrodes of the other transistor.

3. A magnetic amplifier, operable by a direct current source, comprising: a pair of magnetic cores, each having a gate winding thereon; an output transformer having a center-tapped primary winding and a secondary winding, corresponding ends of each of said gate windings being connected to the terminals of said primary winding; a control winding adapted to carry control current and wound around both of said magnetic cores for controlling the flux swing within said cores; a pair of switching power transistors, each having a base electrode, an emitter electrode and a collector electrode, the emitter electrodes each being connected to one of the remaining terminals of said gate windings, said collector electrodes being connected to a common junction; a direct current source being connected between said center tap of said primary transformer winding and said common junction; square wave generator means coupled to said base-emitter electrodes for alternately causing said transistors to go into conduction.

4. The invention, as defined in claim 3, wherein a load to be controlled is connected across the secondary winding of said output transformer.

5. A magnetic amplifier, operable by a direct current source, comprising: a pair of magnetic cores, each having a gate winding thereon; an output transformer having a center-tapped primary winding and a secondary winding, corresponding ends of each of said gate windings being connected to the terminals of said primary winding; a control winding adapted to carry control current and wound around both of said magnetic cores for controlling the flux swing within said cores; a pair of switching power transistors, each having a base electrode, an emitter electrode and a collector electrode, the emitter electrodes each being connected to one of the remaining terminals of said gate windings, said collector electrodes being connected to a common junction; square wave generator means connected to the primary winding of a transformer, said transformer having a pair of secondary windings, one of said windings being connected across the base and emitter electrodes of one transistor, the other of said windings being connected across the base and emitter electrodes of the other transistor.

6. A magnetic amplifier comprising: a pair of magnetic cores; a pair of gate windings, one gate winding magnetically coupled with one core, the other gate winding magnetically coupled with the other core; a first junction point, said gate windings being serially connected by said first junction point; a control winding magnetically coupled with both said cores; a pair of transistors, each transistor having a base electrode, an emitter electrode and a collector electrode, the emitter electrode of one transistor being connected with said one gate winding, the emitter electrode of the other transistor being connected with said other gate winding; a second junction point, the collector electrodes of the transistors being serially coupled by said second junction point; series-connected direct-current source means and load means, the series-connected source means and load means being connected between said first and second junction points; and, square wave generator means coupled with the base-emitter electrodes of both transistors for alternately causing said transistors to conduct.

References Cited in the file of this patent

UNITED STATES PATENTS

| | | |
|---|---|---|
| 2,458,937 | Glass | Jan. 11, 1949 |
| 2,740,086 | Evans et al. | Mar. 27, 1956 |
| 2,760,088 | Pittman et al. | Aug. 21, 1956 |
| 2,773,132 | Bright | Dec. 4, 1956 |
| 2,848,614 | Lyons | Aug. 9, 1958 |